US010110160B2

(12) United States Patent
Hudson

(10) Patent No.: US 10,110,160 B2
(45) Date of Patent: Oct. 23, 2018

(54) THREE-DIRECTIONAL PHOTOVOLTAIC MODULE CONNECTOR

(71) Applicant: SolarCity Corporation, San Mateo, CA (US)

(72) Inventor: Tyrus Hawkes Hudson, San Mateo, CA (US)

(73) Assignee: SolarCity Corporation, San Mateo, CA (US)

( * ) Notice: Subject to any disclaimer, the term of this patent is extended or adjusted under 35 U.S.C. 154(b) by 100 days.

(21) Appl. No.: 15/166,197

(22) Filed: May 26, 2016

(65) Prior Publication Data

US 2017/0201207 A1    Jul. 13, 2017

Related U.S. Application Data

(60) Provisional application No. 62/277,404, filed on Jan. 11, 2016.

(51) Int. Cl.
*H02S 20/24* (2014.01)
*H02S 20/30* (2014.01)
*H02S 30/10* (2014.01)
*H02S 20/23* (2014.01)
*F24S 25/00* (2018.01)

(52) U.S. Cl.
CPC .............. *H02S 30/10* (2014.12); *F24S 25/00* (2018.05); *H02S 20/23* (2014.12); *Y02B 10/12* (2013.01)

(58) Field of Classification Search
CPC ........ F24J 2/5264; F24J 2/5262; F24J 2/5243; F24J 2/5245; H02S 30/10; H02S 20/23; H02S 20/24; H02S 20/30
See application file for complete search history.

(56) References Cited

U.S. PATENT DOCUMENTS

| | | | |
|---|---|---|---|
| 3,470,598 A * | 10/1969 | Berthelsen | B29C 47/025 228/142 |
| 4,226,791 A | 10/1980 | Hirai et al. | |
| 5,203,135 A * | 4/1993 | Bastian | F16B 7/0413 403/292 |
| 5,491,951 A * | 2/1996 | Riegelman | E06B 3/205 52/309.16 |
| 8,109,048 B2 | 2/2012 | West et al. | |
| 8,590,223 B2 | 11/2013 | Kilgore et al. | |
| 8,595,996 B2 | 12/2013 | Korman et al. | |
| 8,661,747 B2 | 3/2014 | Eide | |

(Continued)

FOREIGN PATENT DOCUMENTS

| EP | 2530403 B1 | 1/2015 |
|---|---|---|
| JP | 2014231730 A | 12/2014 |
| WO | 2014/004279 A1 | 1/2014 |

*Primary Examiner* — Michael P Ferguson
(74) *Attorney, Agent, or Firm* — Kilpatrick Townsend & Stockton LLP

(57) ABSTRACT

A three-directional photovoltaic module connector. The module connector includes first serial connection portion on each side for connecting two adjacent photovoltaic modules together in a serial, end-to-end connection. The module connector also includes a first parallel connection portion for connecting the two serially connected pairs of adjacent photovoltaic modules together in parallel, that is, side-to-side. The module connector further includes a vertical connection portion for attaching a mounting foot to elevate the photovoltaic module connector above a support surface such as a roof.

14 Claims, 7 Drawing Sheets

(56) References Cited

U.S. PATENT DOCUMENTS

| | | | |
|---|---|---|---|
| 8,816,189 B2 | 8/2014 | Janssens et al. | |
| 8,919,052 B2 * | 12/2014 | West | F24J 2/5211 52/173.3 |
| 8,919,075 B2 | 12/2014 | Erickson | |
| 2003/0070368 A1 * | 4/2003 | Shingleton | F24J 2/5205 52/173.3 |
| 2012/0234378 A1 * | 9/2012 | West | F24J 2/5211 136/251 |
| 2014/0202525 A1 | 7/2014 | Janssens et al. | |
| 2015/0204583 A1 * | 7/2015 | Stephan | F24J 2/5262 403/375 |
| 2016/0006390 A1 * | 1/2016 | Cinnamon | H02S 20/23 248/237 |

* cited by examiner

THREE-DIRECTIONAL PHOTOVOLTAIC MODULE CONNECTOR

CROSS-REFERENCE TO RELATED APPLICATION

This claims the benefit of U.S. Provisional Application No. 62/277,404, titled "THREE-DIRECTIONAL PHOTOVOLTAIC MODULE CONNECTOR" and filed Jan. 11, 2016, which is herein incorporated by reference in its entirety.

TECHNICAL FIELD

The present disclosure relates to connectors for photovoltaic modules and in particular to connectors for holding four photovoltaic modules together at their adjacent corners above a support surface such as a roof.

BACKGROUND OF THE INVENTION

Photovoltaics have gained popularity in recent years. One reason has been a reduction in the cost and complexity of photovoltaic (PV) or solar mounting systems. Traditionally, residential solar was installed by first laying out a grid of rows and/or columns of rails on the roof mounting plane, and then attaching solar panels to those rails with brackets or clamps. Eventually, pioneers in the solar industry realized that the frames of solar modules themselves are rigid enough to function as the rails, and therefore, rail-based systems are unnecessarily redundant. This led to the proliferation of so-called rail-free mounting systems, a vast improvement over traditional mounting systems. One such rail-free mounting system is that manufactured and sold by SolarCity Corp. of San Mateo, Calif.

Rail-free mounting systems often utilize a combination of mounting feet and interlocks. Mounting feet, sometimes called leveling feet, are roof-penetrating support structures that are permanently attached to the roof surface and include an upward projecting leg that in turn is attached to and/or supports a PV module frame connector that connects to the frames of two or more adjacent photovoltaic modules, near their intersection in the array, and supports them above the roof surface. Interlocks are coupling devices that interconnect either two or four photovoltaic modules at the intersection of their respective adjacent corners such that in combination with the mounting feet, they convert the array of individual modules into a unitary, interconnected array. This helps to distribute forces across the array.

When installing a PV array using a rail-free mounting system, physical conflicts between interlocks and mounting feet may arise. This happens because the location of the former is dictated by the location of the intersection of two adjacent modules while the location of the latter is constrained by the position of the roof rafters under the roof. The location of rafters is often unknown when the array layout is being designed. As a result, there is very little flexibility in the location of either interlocks or mounting feet—interlocks must span the gap between adjacent modules and mounting feet must penetrate the roof at the center of a 2-inch wide roof rafter. Therefore, it is possible that both of these devices will need to occupy the same physical space. When this happens, the installer is often forced to omit one or the other of these devices from the installation, which can make the array less secure than it would otherwise be.

Accordingly, there is a need for a rail-free mounting component that reduces, and ideally eliminates, the occurrence of such conflicts.

SUMMARY OF THE INVENTION

Various embodiments of the disclosure provide for a three-directional photovoltaic module connector that includes a first serial connection portion that has a lower ledge and an upper ledge on each side of the module connector, a second parallel connection portion that has a first pair of apertures located near each distal end of the elongated member which pass through the connector in a direction perpendicular to the primary axis of the connector, and a third vertical connection portion that has a second pair of apertures, orthogonal to the first pair of apertures, passing from a bottom of the elongated member to the top of the elongated member, where the photovoltaic module connector is formed through a casting process, and the elongate member includes a plurality of voids that are obscured via a subsequent additive process.

In various aspects, the lower ledge and the upper ledge can both extend laterally an equal distance from the primary axis or centerline of the connector. The connector can be substantially cast from a casting process, and in particular, at least a portion of either the lower ledge or upper ledge can be formed from an additive process after the casting process. Each of the first pair of apertures can be dimensioned to receive a two-sided rotating photovoltaic module frame connector. The lower ledge and the upper ledge on one side of the module connector can have substantively flat surfaces configured to receive one or more photovoltaic modules, where those photovoltaic modules attach from a generally horizontal direction. Conversely, the lower ledge and the upper ledge on the other (opposing) side of the module connector have substantively tapered surfaces configured to receive one or more photovoltaic modules, where those photovoltaic modules attach by rotating or pivoting into position. In various embodiments, a portion of the lower ledges can be formed with a cut-away section (alternatively referred to as a void), and/or a portion of the vertical face of the three-directional connector can be formed with a cut-away section.

In various embodiments, the present disclosure is directed to an array of photovoltaic modules constructed from a plurality of photovoltaic modules, a plurality of three-directional connectors, and a plurality of mounting feet, where up to four photovoltaic modules are mechanically coupled to each other by one of the three-directional connectors, where each of the three-directional photovoltaic module connectors is positioned to mechanically couple with one of the mounting feet, and where each three-directional connector is formed through a casting process includes a plurality of voids that are obscured via a subsequent additive process. Each three-directional connector of the array can have a first side with a first upper and a first lower ledge which both extend about half the length of the three-directional connector, and a second side with a second upper and a second lower ledge which both extend about the entire length of the three-directional connector.

The three-directional connector can be mechanically coupled to the four photovoltaic modules by extending at least one-and-a-half inches along the length of each of the four photovoltaic modules, particularly at the corners of the photovoltaic modules. Each of the three-directional connectors can have a first side with a first pair of ledges configured to horizontally couple with up to two photovoltaic modules and a second side with a second pair of ledges configured to rotationally couple with up to two photovoltaic modules. The photovoltaic modules mounted on the same side of one of the three-directional connector can be referred to as mounted in series, while photovoltaic modules mounted directly on opposing sides of one of the three-directional connector (at about the same location along the length of the three-directional connector) can be referred to as mounted in parallel. The overall array can also include at least one skirt structure mechanically coupled to at least one of the three-directional connectors along one edge of the photovoltaic array. Further, the photovoltaic modules can have grooved frames, and the three-directional connectors can have lateral apertures, such that when a rotational connector is fit into a lateral aperture and into a photovoltaic module frame groove, the rotational connector can be rotated to lock or fasten photovoltaic module and a three-directional connector to each other at a position within the photovoltaic module frame groove.

In various embodiments, the present disclosure is directed to a method of installing a photovoltaic array that can include the steps of elevating a first set of photovoltaic modules over a roof, horizontally attaching a three-directional connector to the first set of photovoltaic modules, securing the three-directional connector to the first set of photovoltaic modules with one or more rotational connectors passing through one or more lateral apertures in the three-directional connector, coupling the three-directional connector to a leveling foot through a vertical aperture in the three-directional connector, securing the leveling foot to a structural support element in the roof below the three-directional connector, and pivotally attaching a second set of photovoltaic modules to the three-directional connector. The method can further include the step of positioning the three-directional connector both between the first set of photovoltaic modules and the second set of photovoltaic modules, and also proximately above the structural support element in the roof. The method can also include attaching a skirt to at least one three-directional connector at an edge of the photovoltaic array.

In further embodiments, the present disclosure is directed to a method of manufacturing a three-directional photovoltaic module connector that can include the steps of forming a single connector structure by pouring a molten material into a casting mold, with the connector being made of an elongate member with a first pair of apertures formed in it near each distal end of the elongate member, and a plurality of material voids extending partially through the thickness of the elongate member; hardening the connector structure via a thermal hardening process; and filling in the plurality of material voids with an additive process to create a uniform extruded appearance to the cast elongate member. In some aspects, the additive process can include an overmolding process. In other aspects, the method can also include forming a second pair of threaded apertures that are orthogonal to the first pair of apertures.

Various embodiments of the present disclosure provide new and improved methods and systems for attaching solar panels modules to each other and to support structures of a roof. Various embodiments will reduce costs and increase installation speed over conventional methods and systems.

These and other embodiments will be apparent from the drawing figures and the corresponding detailed description.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

DETAILED DESCRIPTION OF THE INVENTION

Figure 1:
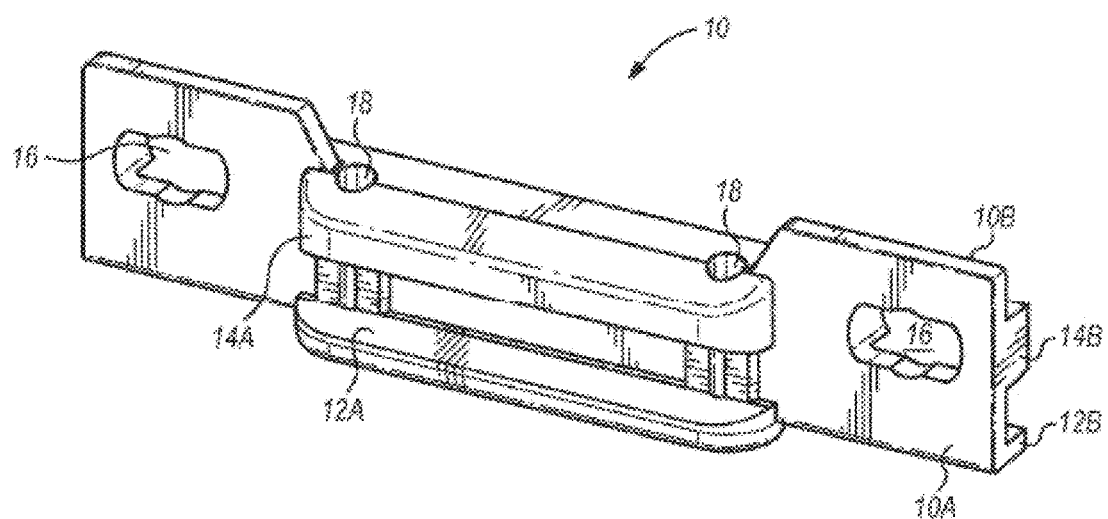
FIG. 1 is a perspective view of a photovoltaic module connector according to various embodiments of the disclosure.

Throughout this description for the purposes of explanation, numerous specific details are set forth in order to provide a thorough understanding of the many aspects and embodiments disclosed herein, particularly by providing a number of specific embodiments and details photovoltaic mounting systems. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Any given roof on which a photovoltaic module array is installed will have an arrangement of rafters specific to that roof. Ideally, the rafters of a roof will follow a patterned and generally uniform spacing, sometimes referred to as a "schedule" or a "layout", such that most if not all of the rafters and other structural support elements will have a predictable or expected location. However, each roof can have unique features or challenges that arise during construction that lead to and require individual variation from a standard spacing between the rafters or other structural support elements for the roof. In other words, the schedule of a roof can have variation in the location of any given structural support element. The schedule of rafters in a roof can, for example, arrange the rafters to be spaced about eighteen inches (18") from each other, about two feet (2') away from each other, or any other distance from each other appropriate for the structural stability of the roof. In various aspects, structural support elements for any given roof can include, but are not limited to, common rafters, jack rafters, creeper rafters, common beams, hip beams, ridge beams, trusses, top chords, bottom chords, diagonals, web members, purlins, braces, battens, fascias, joists, ties, and the like.

A photovoltaic module array will also have a spacing schedule, generally dependent on the size of the photovoltaic modules and the gaps between photovoltaic modules of the array. Photovoltaic modules are generally rectangular, having a long edge and a short edge, and as considered herein, photovoltaic modules can be rectangular modules as known in the industry, including but not limited to, 60-cell PV modules, 72-cell PV modules, 80-cell PV modules, 96-cell PV modules, and the like. Accordingly, the spacing schedule of photovoltaic modules can vary dependent on the size of photovoltaic module used for any given photovoltaic array. Further, the spacing schedule of photovoltaic modules can track the size of gaps between adjacent photovoltaic modules, where such a gap can be from about half-an-inch (½"), about one inch (1"), about two inches (2"), or the like. Mounting structures supporting the photovoltaic modules can include mounting feet, leveling feet, or other such elevating structures for mechanically coupling photovoltaic modules to and above structural support elements of a roof. In many embodiments, the mounting structures can directly connect to the frames of photovoltaic modules.

In some earlier implementations of mounting photovoltaic modules, two distinct components have been used to assemble photovoltaic arrays, interlocks and dedicated mounting foot couplings. Interlocks have been used to connect adjacent photovoltaic modules to each other, while dedicated mounting foot couplings have been used to directly connect photovoltaic modules to mounting feet and thereby to structural supports in a roof, such as rafters. Challenges in assembling photovoltaic arrays with such components have been encountered when, for example, the spacing schedule of photovoltaic modules and the spacing schedule of rafters in a roof overlap or are staggered such that interlocks and mounting foot couplings need to occupy the same physical space. In other words, some of the parts required for coupling the components of the array together may need to occupy the same locations, creating a physical conflict with each other.

In such earlier implementations of mounting photovoltaic modules, various alternative workarounds have been developed to mitigate or avoid physical conflicts and interference between interlocks and mounting foot couplings. In some applications, the size of the interlocks have been reduced, to make room for mounting foot couplings. However, this can come at a cost of tighter tolerances and reduced strength of the photovoltaic module connections. In other applications, the size of mounting foot couplings have been increased to twist or contort around interlocks. However, this can come at a cost of losing leverage and support strength due to the additional distance the mounting foot couplings need to extend, with an associated increase in manufacturing cost due to additional material to make the mounting foot couplings stronger to compensate for the otherwise lost leverage. Both adaptations to the interlocks and mounting foot couplings also can create a greater difficulty in installation and incur a corresponding increased labor cost.

The three-directional connector of the present disclosure can be considered as a hybrid component that replaces the need for distinct and separate interlocks and mounting foot couplings by combining the function of those two structures in a single piece as discussed herein. This can reduce complexity, physical conflicts between array components, manufacturing cost, and installation cost. The structural support provided the three-directional connector in combination with the photovoltaic modules and leveling feet can be more than sufficient to support forces acting on the assembled photovoltaic array from either above or below, such as wind uplift, snow loading, individuals walking on the photovoltaic array, and the like.

As used herein, the term "in series" refers to photovoltaic modules mounted on one side or face of the three-directional connector, where ledges extending outwardly or laterally away from a centerline or primary axis of the three-directional connector operate in combination to allow for such a serial connection. Conversely, as used herein, the term "in parallel" refers to photovoltaic modules mounted on opposite sides of the three-directional connector, where the photovoltaic modules are generally also biased toward the same end as viewed along the centerline primary axis length of the three-directional connector.

Referring now to FIGS. 1-6, FIG. 1 shows a perspective view of three-directional photovoltaic module connector 10 according to various embodiments of the invention. Connector 10 shown here can be used to simultaneously interconnect up to four photovoltaic modules—two connected photovoltaic modules end-to-end in series on each side, and two paired photovoltaic modules connected across each side of connector 10, perpendicular to the primary axis of connector 10, in parallel. Connector 10 can also support all four mechanically connected photovoltaic modules above a support surface such as a roof.

Connector 10 includes an elongated main body with front side 10A, opposite facing back side 10B, bottom portion 10C and opposite facing top portion 10D. As shown, the elongated body includes first pair of apertures 16 located near either distal end of the elongated body. First pair of apertures 16 pass completely through connector 10 from front side 10A through to back side 10B. In various embodiments, first pair of apertures 16 are dimensioned to receive a two-sided parallel photovoltaic module coupling device. In various embodiments, the two-sided parallel photovoltaic module coupling device can consist of a coupling such as the interlock coupling disclosed in commonly assigned U.S. Pat. No. 8,919,052, herein incorporated by reference in its entirety. Because connector 10 devices are each able to support two photovoltaic modules, one on either side of connector 10, first pair of apertures 16 are referred to herein as the parallel connection portion. First pair of apertures 16 can also be alternatively referred to as lateral apertures. The distal ends of connector 10 can be understood to be two ends of the elongated main body viewed along the primary axis, distant from the center of the elongated main body. In various embodiments, first pair of apertures 16 are substantially perpendicular to the primary axis of connector 10 because they interconnect photovoltaic modules that are located on different sides of the primary axis of connector 10.

With continued reference to FIG. 1, front side 10A of connector 10 includes lower ledge 12A and upper ledge 14A, while back side 10B of connector 10 includes lower ledge 12B and upper ledge 14B. In various embodiments, lower ledges 12A, 12B are dimensioned to support up to four photovoltaic module frames from underneath—two serially oriented modules each—while upper ledges 14A, 14B are dimensioned to fit within grooves formed in the frames of the same four photovoltaic modules. Collectively, lower ledges 12A, 12B and upper ledges 14A, 14B are referred to herein as the serial connection portion. This designation stems from the fact that on either front side 10A or back side 10B of connector 10, lower ledges 12A, 12B and upper ledges 14A, 14B help to connect two photovoltaic modules together end-to-end, referred to herein as serially. In some embodiments, one or more additional interlocks can be positioned between edges of two photovoltaic modules arranged serially, to complement the mechanical coupling of the photovoltaic modules.

Figure 2:
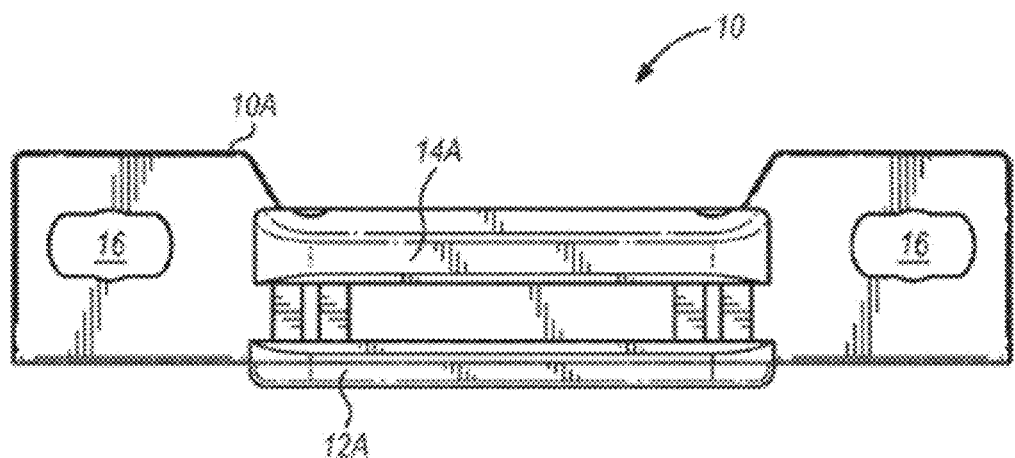
FIG. 2 is a front view of a photovoltaic module connector according to various embodiments of the disclosure.

More specifically each side of connector 10 has a serial connection portion. On front side 10A, front-lower ledge 12A and front-upper ledge 14A form a pair of structural elements that can receive and mechanically support two photovoltaic modules on the same side (front side 10A) of connector 10. Similarly, on back side 10B, back-lower ledge 12B and back-upper ledge 14B form a pair of structural elements that can receive and mechanically support two photovoltaic modules on the same side (back side 10B) of connector 10. In some aspects, front-lower ledge 12A and front-upper ledge 14A on front side 10A can extend along a fraction of the length of connector 10. In some particular aspects, front-lower ledge 12A and front-upper ledge 14A can extend along about half the length of connector 10, centered along the length of connector 10 as seen in FIGS. 1 and 2. In other aspects, back-lower ledge 12B and back-upper ledge 14B on back side 10B can extend along a fraction of the length of connector 10. In some particular aspects, back-lower ledge 12B and back-upper ledge 14B can extend along about the entire length of connector 10 as seen in FIG. 4.

As noted above, first pair of apertures 16 in three-directional connector 10 allow for hardware on a PV module, or additional fastener hardware, to laterally pass through connector 10 and help to mount photovoltaic modules to connector 10 at the locations of first pair of apertures 16. As discussed in further detail in relation to FIG. 3 below, the front-lower ledge 12A and front-upper ledge 14A on front side 10A of connector 10 have sloped, slanted, or tapered surfaces, providing for relatively wider tolerances that allow for a photovoltaic module to rotate or pivot into place supported by front-lower ledge 12A and front-upper ledge 14A. In contrast, back-lower ledge 12B and back-upper ledge 14B have relatively tighter tolerances, which allows for photovoltaic modules to insert into and be received by connector 10 in a primarily horizontal direction.

Figure 4:
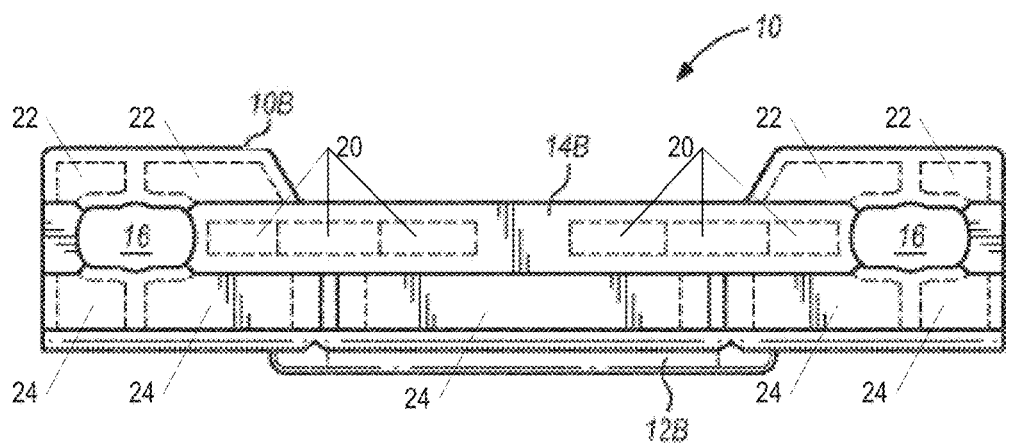
FIG. 4 is a back view of a photovoltaic module connector according to various embodiments of the disclosure.

As shown in particular in FIGS. 2 and 4, upper ledges 14A, 14B are aligned with an imaginary axis spanning from the center of one of first pair of apertures 16 to the center of the other of first pair of apertures 16. The arrangement of first pair of apertures 16 is due to the fact that the two-sided rotating parallel module connectors that fit into first pair of apertures 16, fit into the same module frame groove as upper ledges 14A, 14B when connector 10 is connected to four photovoltaic modules.

In other words, both photovoltaic modules that are horizontally inserted into connector 10 to be mechanically coupled with front-upper ledge 14A and photovoltaic modules that are rotationally inserted into connector 10 to be mechanically coupled with back-upper ledge 14B rest in a position on connector 10 such that grooves in each photovoltaic module frame are aligned with first pair of apertures 16. The alignment of photovoltaic module grooves with first pair of apertures 16 allows for various couplings, such as side rotating parallel module connectors, to pass through the body of connector 10 and secure photovoltaic modules to connector 10. In some aspects, first pair of apertures 16 can be adapted to specifically receive two-sided rotating parallel connectors. Such rotating connectors can be traditional bolts as known in the industry, including so-called "Zep connectors" such as those manufactured by Zep Solar of San Rafael, Calif. Alternatively, rotating connectors may be another type of rotating connector known in the art.

FIG. 2 more particularly shows front side 10A of connector 10. Front-lower ledge 12A is shown having a degree of slope, slant, or taper on its top side, while front-upper ledge 14A is shown having a degree of slope, slant, or taper on both of its top and bottom sides. Accordingly, a photovoltaic module configured to fit into the space defined between front-lower ledge 12A and front-upper ledge 14A can pivot or rotate into a position at least partially filling that space with adequate tolerance such that the frame of the photovoltaic module can snugly fit and couple with connector 10. Moreover, the frame of the photovoltaic module can fit with connector 10 without excessive or detrimental friction, strain, or deformation to either the photovoltaic module frame or connector 10 as the two components are mechanically coupled together. In various aspects, the degree of slope, slant, or taper of front lower ledge 12A can be greater than, equal to, or less than the degree of slope, slant, or taper of either the top side or bottom side of front-upper ledge 14A.

Figure 3:
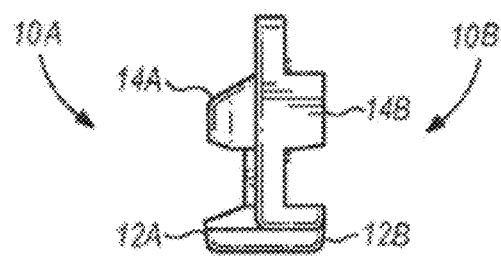
FIG. 3 is an end view of a photovoltaic module connector according to various embodiments of the disclosure.

FIG. 3 shows an end view of connector 10 with front side 10A facing to the left and back side 10B facing to the right. As shown in FIG. 3, front-lower ledge 12A and front-upper ledge 14A extending from front side 10A are not completely symmetrical with back-lower ledge 12B and back-upper ledge 14B extending from back side 10B. This can be due to the order in which connector 10 is attached to photovoltaic modules. For example, in various embodiments, back side 10B of connector 10 can be attached to the frames of two adjacent photovoltaic modules so that each of those two adjacent photovoltaic modules are connected to one another serially. This is accomplished by fitting connector 10 to the frames so that back-upper ledge 14B spans across the groove formed in the frames of two adjacent photovoltaic modules with back-lower ledge 12B spanning across the bottom of the frames of those two adjacent photovoltaic modules. These two adjacent photovoltaic modules can slide into connection with back-upper ledge 14B and back-lower ledge 12B in a generally horizontal direction, substantially parallel to back-upper ledge 14B and back-lower ledge 12B. Then, a pair of two-sided rotating parallel connectors are inserted in first pair of apertures 16 and further one side of each of the two-sided rotating parallel connectors are inserted into the same grooves as back-upper ledge 14B. The geometry of these rotating parallel connectors is such that they fit into a groove in a first orientation but then cannot be removed from the groove in a second orientation. Once those rotating parallel connectors are rotated, typically by applying torque with a wrench or other tool and turning them ninety degrees (90°), they become locked within the photovoltaic module frame groove. In this way, two adjacent modules become locked together serially, that is, end-to-end.

Subsequently, two more photovoltaic modules may be attached to front side 10A of connector 10 by approaching front side 10A at an angle and then allowing each of the photovoltaic modules to rotate or pivot down until they are substantially parallel with the plane defined by photovoltaic modules connected to back side 10B. This assembly process can be continued across the length and width of the photovoltaic array.

It can be further seen in FIG. 3 that front-lower ledge 12A, back-lower ledge 12B, front-upper ledge 14A, and back-upper ledge 14B each extend a relatively equal distance outwardly or laterally away from a centerline or primary axis of connector 10. In other embodiments of connector 10, any one or combination of front-lower ledge 12A, back-lower ledge 12B, front-upper ledge 14A, and back-upper ledge 14B can extend a distance from a centerline of connector 10 relatively greater than or less than any one of the other such ledges.

FIG. 4 more particularly shows back side 10B of connector 10. Back-lower ledge 12B and back-upper ledge 14B are both shown having flat surfaces configured to come into contact with and support photovoltaic modules, particularly one or two photovoltaic module frames. Particularly, the bottom side of back-upper ledge 14B and the top side of back-lower ledge 12B are both substantively flat and configured to receive photovoltaic modules along a generally horizontal plane or from a direction substantively parallel to the corresponding horizontal axes of back-lower ledge 12B and back-upper ledge 14B.

Also seen in connector 10 are optional cut-away sections 20, 22, 24 represented by dashed-line borders in the vertical face of connector 10. Each of optional cut-away sections 20, 22, 24 individually indicated can be absent from connector 10 when connector 10 is cast, molded, cut, or otherwise formed. Optional cut-away sections 20, 22, 24 can be more precisely identified as central face cut-away sections 20, upper face cut-away sections 22, and lower face cut-away sections 24. Removal of material from connector 10 at cut-away sections 20, 22, 24, or formation of connector 10 without material at cut-away sections 20, 22, 24, can lighten the overall weight of connector 10 (relative to versions of connector 10 having a full or complete body) as well as reducing the amount of metal required to make the part. In various alternative embodiments, connector 10 can be produced with any one of cut-away sections 20, 22, 24, or any combination of cut-away sections 20, 22, 24, not present in the body of connector 10. Cut-away sections 20, 22, 24 can be chosen to ensure that connector 10 retains structural integrity and sufficient strength for both connecting adjacent photovoltaic modules (both serially and in parallel) and supporting photovoltaic modules as part of an array via mounting feet. However, it should be appreciated that cut-away sections 20, 22, and 24 may be filed in with material such as plastic or rubber overmolding to create a smooth appearance and obscure the presence of these voids. Such materials may be added after casting connector 10. This smooth appearance may make connector 10 appear to have been created as an extrusion instead of being cast.

Figure 5:
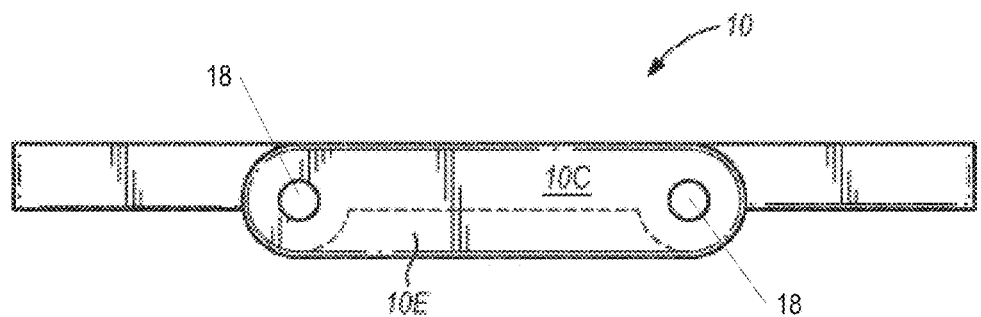
FIG. 5 is a bottom view of a photovoltaic module connector according to various embodiments of the disclosure.
Figure 6:
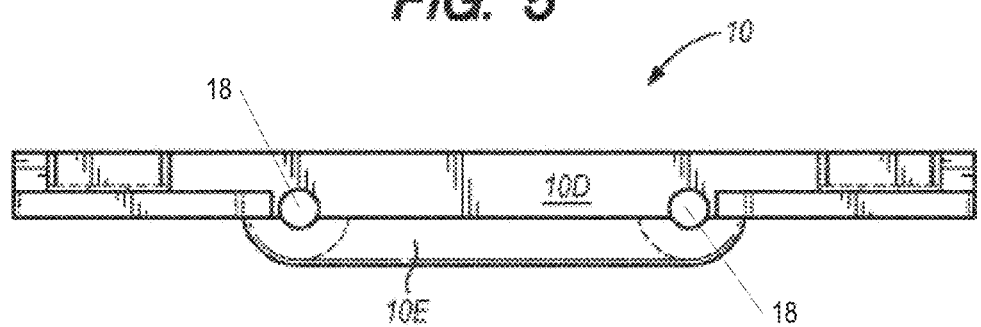
FIG. 6 is a top view of a photovoltaic module connector according to various embodiments of the disclosure.

FIGS. 5 and 6 show bottom portion 10C and top portion 10D of connector 10, respectively. As shown in FIGS. 5 and 6, connector 10 also includes second pair of apertures 18, alternatively referred to as vertical apertures or threaded apertures. In various embodiments, second pair of apertures 18 provide for alternative mounting locations for attaching a mounting foot or other vertical support structure to connector 10. Consequently, second pair of apertures 18 are referred to herein as the vertical mounting portion. A mounting foot configured to mechanically couple with the vertical mounting portion can include a threaded stud and base such as seen and described, for example, in the commonly assigned U.S. Pat. No. 8,919,052. Second pair of apertures 18 can be threaded to receive a threaded stud from a leveling foot or other structure. Alternatively, a hanger bolt, lag bolt, or other structure may pass through one or more of second pair of apertures 18.

Vertical apertures such as second pair of apertures 18 allow for connector 10 to couple with mounting feet or other such structures to further support an overall array of photovoltaic modules on a surface such as a roof. Connectors 10 are generally positioned over rafters in a roof in an arrangement such that mounting feet coupled to connectors 10 can further secure to the rafters (or other structurally supporting parts) of the roof. The length of connectors 10, and the ability of connectors 10 to be positioned in a centered or biased location when coupling photovoltaic modules, allows for the schedule of connectors 10 to have a degree of flexibility, such that the connectors (and thus the mounting feet) can match the schedule of the rafters in the underlying roof In other words, connector 10 positioned between and interlocking two, three, or four photovoltaic modules, can be sufficiently long such that connector 10 can be slid along the frames of the photovoltaic modules to have a majority of connector 10 length biased toward one or two of the photovoltaic modules while still providing structural support to all of the connected photovoltaic modules. The variability in the location of connector 10 between the photovoltaic modules allows for the location of second pair of apertures 18 to shift correspondingly, which allows for mounting feet to properly and securely engage both with connector 10 and with the rafters (or other structurally supporting elements) of the underlying roof.

In some aspects, only one or the other of the vertical apertures can be used to connect with a mounting foot to further connect to a rafter. In other aspects, both of the vertical apertures can be used to connect with a pair of mounting feet to further connect to one or more rafters. Connector 10 as mechanically coupled with exemplary mounting feet via each individual aperture of second pair of apertures can be seen in FIGS. 9A and 9B, below.

FIGS. 5 and 6 further show that second pair of apertures 18 can be equally spaced from the center of connector 10. In alternative aspects, connector 10 can be formed such that either or both of second pair of apertures 18 are relatively closer to or further from the center of connector 10.

Typical interlock devices are manufactured using an aluminum extrusion process. Extrusion passes metal through an extrusion plate that imposes a uniform profile to the resultant metal in the shape defined by the plate. The advantage of extrusion process is that the plate is very inexpensive relative to dies or other machines, and long distances of uniform material can be produced at once. However, any changes to the resultant extruded product will require cutting, abrasion, drilling, and/or stamping to achieve the desired final product geometry. Also, because the uniformity of extrusions, any portions requiring additional thickness must include that thickness along the entire length of the extrusion or else require expensive post-extrusion processing to remove extruded material.

In various embodiments and in contrast to extrusion processes, connector 10 may avoid some of the problems of products made through an extrusion process by using a casting process such as die casting, investment casting, or other suitable casting process. Alternatively, connector 10 could be stamped out of a blank of steel, aluminum, other metals and alloys, or other material. It should be appreciated that unlike extrusions, casting and stamping allow a near infinite variety of shapes that do not need to be uniform over the entire length of connector 10. Voids, cut-away sections, curves, and other features may be selectively formed within either front side 10A or back side 10B of connector 10 that cannot be made via extrusion. These types of features may be necessary to achieve a particular look or shape, and/or to minimize or reduce the amount of material consumed per product. A cheaper additive process may be used to cover up such features, for example, when such features aesthetic and/or not part of the product load path during use as part of a photovoltaic array component. To this end, as noted above in FIGS. 5 and 6, a portion of ledges 12A, 14A, 12B, and 14B on sides 10A and 10B respectively, which can be referred to as lower ledge cut-away sections 10E, are shown in dashed lines. Lower ledge cut-away sections 10E can be portions formed from an additive process after casting or stamping the remainder of connector 10. Over-molding is one such process that may be used to add material to fill in the void defined by lower ledge cut-away sections 10E to provide the appearance that a ledge containing the optional cut-away section extends solidly between the second pair of apertures 18. Because the entire ledge is not needed as part of the load path, only a portion of cast material around second pair of apertures 18 is needed to provide support for a mounting foot or leveling foot; the remainder of the ledge can be formed of over-molded rubber or other moldable material. Over-molding can also be used to square off edges and/or to provide a smooth external surface to connector 10 without compromising the strength or integrity of connector 10.

Figure 7A:
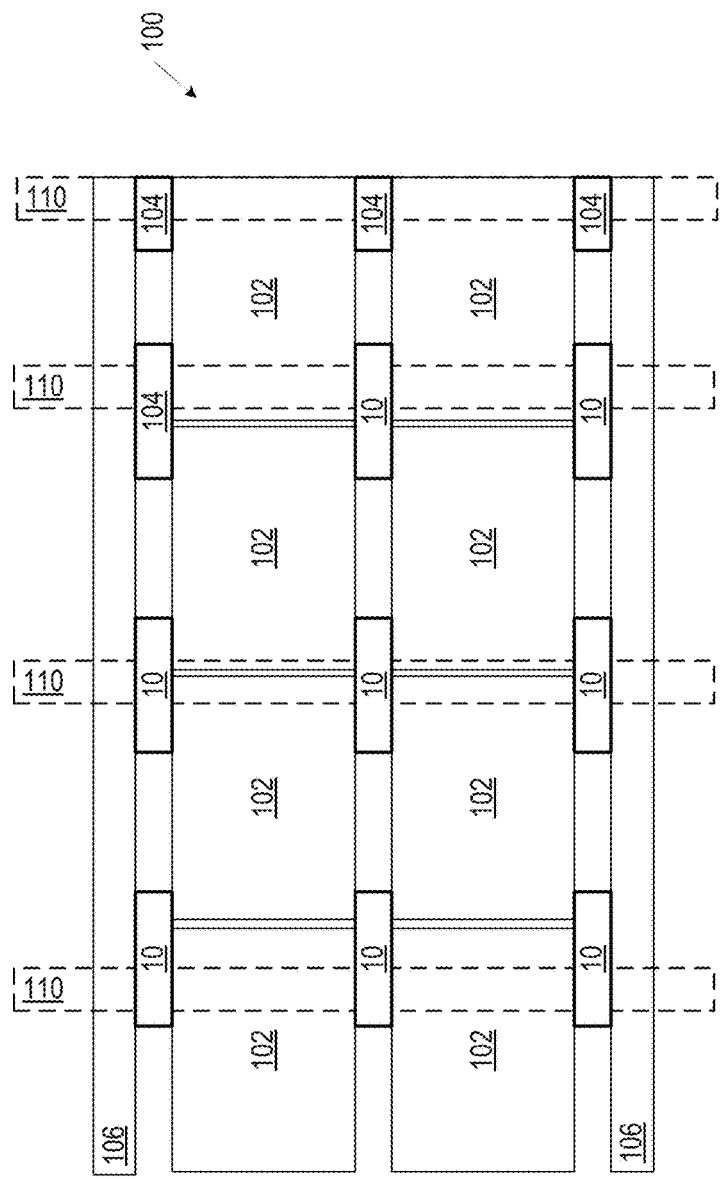
FIG. 7A is a top view schematic representation of a photovoltaic array using photovoltaic module connectors according to an embodiment of the disclosure.
Figure 7B:
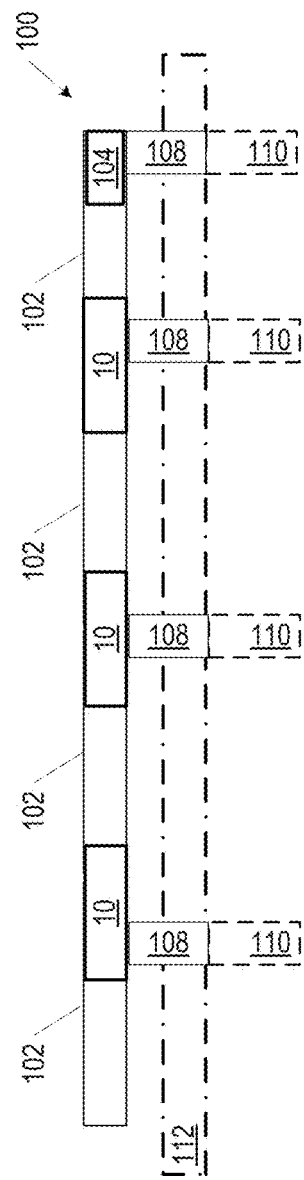
FIG. 7B is a side view schematic representation of a photovoltaic array using photovoltaic module connectors according to an embodiment of the disclosure.

FIG. 7A is a top view schematic representation of photovoltaic array 100 primarily using PV module connectors 10 to connect photovoltaic modules 102 to each other and also to rafters 110. FIG. 7B is a side view schematic representation of photovoltaic array 100, further showing PV module connectors 10 connecting photovoltaic modules 102 to each other and also, via mounting feet 108, to rafters 110 that in part support the structure of roof 112. It can be understood that rafters 110, in various aspects, can represent other supporting structures of roof 112.

As shown, exemplary photovoltaic array 100 includes two rows and four columns of photovoltaic modules 102, though it is understood that use of PV module connectors 10 between photovoltaic modules 102 can be applied to photovoltaic arrays having more or fewer rows and/or columns. Photovoltaic array 100 is further shown as bounded above the uppermost row of photovoltaic modules 102 and below the lowermost row of photovoltaic modules 102 by skirts 106. PV module connectors 10 are shown in several positions between various photovoltaic modules 102, and correspondingly, over rafter 110. For example, PV module connectors 10 on the left side of photovoltaic array 100 are positioned so that PV module connectors 10 are biased toward the leftmost column of photovoltaic modules 102 and also so that the left sides of PV module connectors 10 are positioned above the corresponding rafter 110. In contrast, PV module connectors 10 in the center of photovoltaic array 100 are positioned so that PV module connectors 10 are generally equally biased between the two central columns of photovoltaic modules 102 and also so that the PV module connectors 10 are positioned generally centered above corresponding rafter 110. In further contrast, PV module connectors 10 on the right side of photovoltaic array 100 are positioned so that PV module connectors 10 are biased toward the rightmost column of photovoltaic modules 102 and also so that the right sides of PV module connectors 10 are positioned above the corresponding rafter 110. PV module connectors 10 can also secure skirts 106 to photovoltaic modules 102 as part of photovoltaic array 100.

FIG. 7B presents a side profile schematic of photovoltaic array 100 (without skirt 106) further showing mounting feet 108 connecting PV module connectors 10 located above rafters 110. PV module connectors 10, are shown spanning across various lengths of photovoltaic modules 102 that are coupled together by PV module connectors 10. In various aspects, PV module connectors 10 can be about eight inches (8") long, providing for a sufficient length to extend along a length of and support two photovoltaic modules 102 arranged in series. In some aspects, PV module connector 10 can be connected to two photovoltaic modules 102 arranged in series extending three-and-a-half inches (3½") along the length of each photovoltaic module 102, with a half-an-inch (½") gap between those two photovoltaic modules 102. In other aspects, PV module connector 10 can be connected to two photovoltaic modules 102 arranged in series extending one-and-a-half inches (1½") along the length of one of those two photovoltaic module 102, which can be a distance sufficient to support at least one corner of any given photovoltaic module 102. PV module connectors 10 can also have a width adequate to span and/or define a gap between photovoltaic modules 102 in adjacent rows and support two photovoltaic modules 102 arranged in parallel.

Additionally seen in FIG. 7A and 7B are edge interlocks 104 on the rightmost side of photovoltaic array 100, configured to couple to at most two photovoltaic modules 102 and/or skirt 106. Edge interlocks 104 can similarly couple with mounting feet 108 to help secure photovoltaic array 100 to rafters 110 underlying roof 112. In alternative aspects of photovoltaic array 100, PV module connectors 10 can be used instead of edge interlocks 104, where PV module connectors 10 are coupled to two photovoltaic modules 102 (or to one photovoltaic module and to a section of skirt 106). While the rightmost side of photovoltaic array 100 is terminated along the edges of the corresponding two photovoltaic modules 102, edge interlocks 104, and ends of skirts 106, in alternative aspects a further skirt along either the leftmost or rightmost side of photovoltaic array 100 can be included as part of the overall assembly.

In various embodiments of photovoltaic array 100, it can be understood that while PV module connectors 10 can be used to couple adjacent photovoltaic modules 102, it is not necessary that specific PV module connectors 10 as disclosed herein couple all adjacent photovoltaic modules 102 of photovoltaic array 100. Similarly, it is not necessary that only PV module connectors 10 as disclosed herein are used to connect with mounting feet 108 and to rafters 110. In various embodiments, rafters 110 can be beams, trusses, joints, or the like.

Figure 7C:
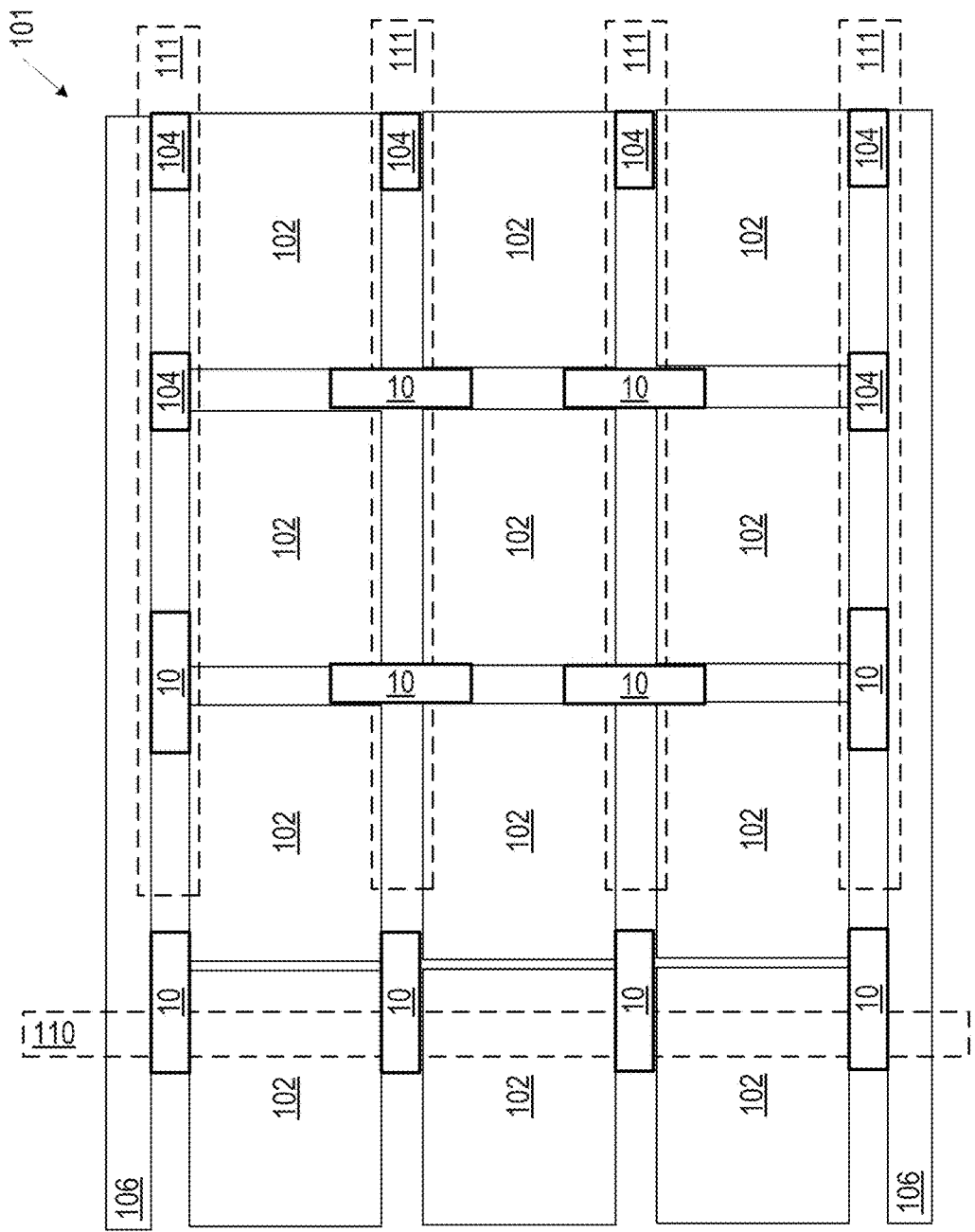
FIG. 7C is a top view schematic representation of a photovoltaic array using photovoltaic module connectors according to an alternative embodiment of the disclosure.

FIG. 7C is a top view schematic representation of photovoltaic array 101 using photovoltaic module connectors 10 in an alternative arrangement as compared to FIG. 7A. PV module connectors 10 on the left side of photovoltaic array 101 are positioned so that PV module connectors 10 are biased toward the leftmost column of photovoltaic modules 102 and also so that the left sides of PV module connectors 10 are positioned above the corresponding rafter 110. Further, PV module connectors 10 on the left side of photovoltaic array 101 can be arranged in a North-South orientation in accordance with the orientation of photovoltaic modules 102 in photovoltaic array 101.

PV module connectors 10 can also be arranged in an East-West orientation between photovoltaic modules 102, as seen between the three rightmost columns of photovoltaic modules 102 in photovoltaic array 101. PV module connectors 10 arranged in an East-West orientation can be positioned above secondary rafters 111, where secondary rafters 111 are set perpendicular to rafter 110 within roof 112. In various embodiments, secondary rafters 111 can be beams, trusses, joints, or the like. In other embodiments, secondary rafters can be arranged diagonally or otherwise offset from the orientation of rafter 110. Mounting feet 108 can couple PV module connectors 10 to both rafters 110 and secondary rafters 111.

Figure 8:
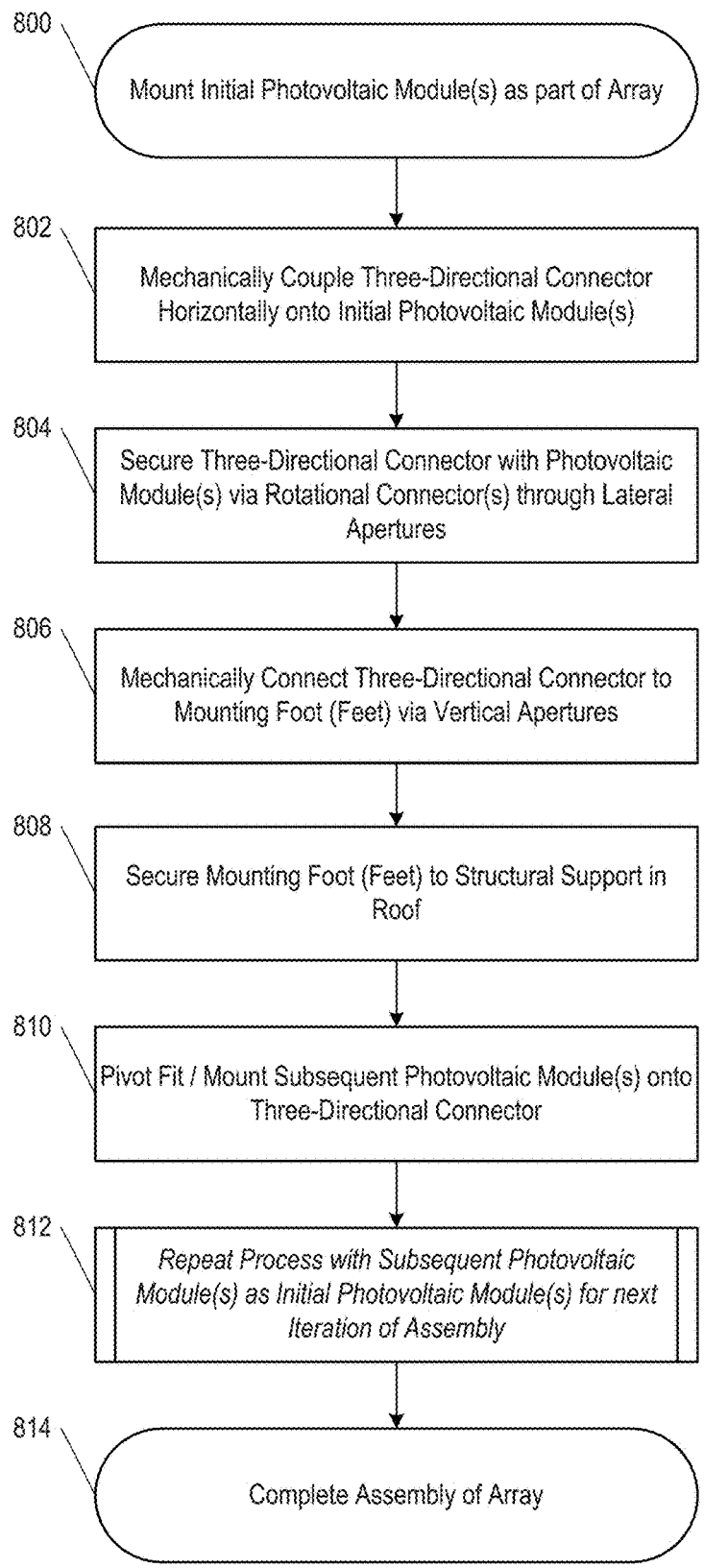
FIG. 8 is a flowchart describing a photovoltaic array assembly process according to various embodiments of the disclosure.

FIG. 8 is a flowchart describing a photovoltaic array assembly process. At step 800, initial photovoltaic module (s) can be mounted as part of a photovoltaic array, which in many embodiments can be elevating the photovoltaic modules over a roof. At step 802, a three-directional connecter can be horizontally moved into contact with the initial photovoltaic module(s). Depending on the section of the photovoltaic array, the three-directional connecter can mechanically couple with the one or two initial photovoltaic modules via ledges on the three-directional connector. In some aspects, flat ledges of the three-directional connector can fit in or around a groove structure in the initial photovoltaic module(s). At step 804, rotational connectors (e.g. Zep connectors) can pass through lateral apertures in the three-directional connecter, into the groove structure of the photovoltaic module(s), and be rotated to physically secure the photovoltaic module(s) and the three-directional connector to each other. A pair of initial photovoltaic modules mechanically coupled to a three-directional connecter in this manner can be considered as serially connected.

At step 806, the three-directional connector can be connected via a vertical connection portion to a mounting foot to a structural support member of an underlying surface (such as the roof). The mounting foot may come pre-attached to one of the threaded holes in the three-directional connector. In some aspects, the three-directional connector can have two threaded holes passing through the height of the three-directional connector into which screws or bolts of a mounting foot can mechanically couple and secure. In many aspects, a single mounting foot is connected with only one of the two threaded holes of the vertical connection portion. In other aspects, the height of the mounting foot can be adjusted such that the elevation at which the three-directional connector is mounted can be adjusted and be made level or uniform with the plane defined by the photovoltaic modules of the overall photovoltaic array. At step 808, the mounting foot can be secured to a structural support in the underlying structure, such as a rafter, beam, truss, joint, or other such load-bearing structure of a roof. The spacing between mounting feet can be adjusted by the positioning of the three-directional connector along the length of the photovoltaic modules such that the mounting feet are generally proximate to structural support members of the roof, such as rafters. In some embodiments, assembly of a photovoltaic array can proceed with step 808 being performed before step 806. In alternative embodiments, a three-directional connecter having two threaded holes can have two mounting feet, or other such hardware, connected to both threaded holes of the vertical connection portion.

At step 810, subsequent photovoltaic module(s) can be mounted as part of the photovoltaic array on the side of the three-directional connecter opposite of where the initial subsequent photovoltaic module(s) are mounted. The subsequent photovoltaic module(s) can be rotated into, or pivoted, into contact with the three-directional connector. Depending on the section of the photovoltaic array, the three-directional connecter can mechanically couple with the one or two subsequent photovoltaic modules via ledges on the three-directional connector. In some aspects, the three-directional connector can have tapered ledges, such that the one or two subsequent photovoltaic modules can rotate or pivot into a mounting position with enough space or tolerance for the frame of the photovoltaic module(s) to fit with the three-directional connector. The tapered ledges of the three-directional connector can fit in or around a groove structure in the subsequent photovoltaic module(s). In some aspects, the coupling of the subsequent photovoltaic module(s) with the three-directional connector can be considered gravity-assisted, where the load moment of the subsequent photovoltaic module(s) is sufficiently distant from the interface the three-directional connector such that the torque from the subsequent photovoltaic module(s) upward on the ledge of the three-directional connector locks the subsequent photovoltaic module(s) to the three-directional connector. A pair of subsequent photovoltaic modules mechanically coupled to a three-directional connector in this manner can be considered as serially connected to each other and connected in parallel to the initial photovoltaic module (s).

At step 812, the process of step 802 through step 810 can be repeated, where the subsequent photovoltaic module(s) can be used as the initial photovoltaic module(s) for the next iteration of assembling the photovoltaic array. Repetition of this process can extend the width and/or the length of the overall photovoltaic array as appropriate for any given installation. At step 814, the assembly of the photovoltaic array can be completed, further adding components such as skirts, interlocks, electrical connectors, or the like, as appropriate for the specific installation.

Figure 9A:
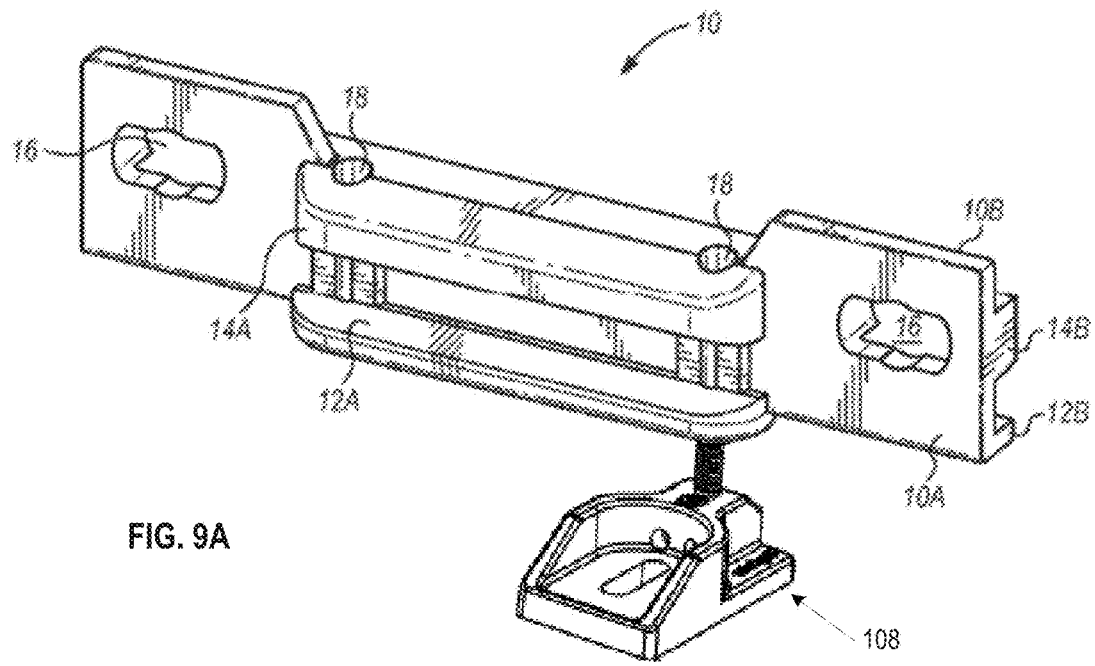
FIG. 9A is a perspective view of a photovoltaic module connector as shown in FIG. 1, coupled with a mounting foot, according to an embodiment of the disclosure.
Figure 9B:
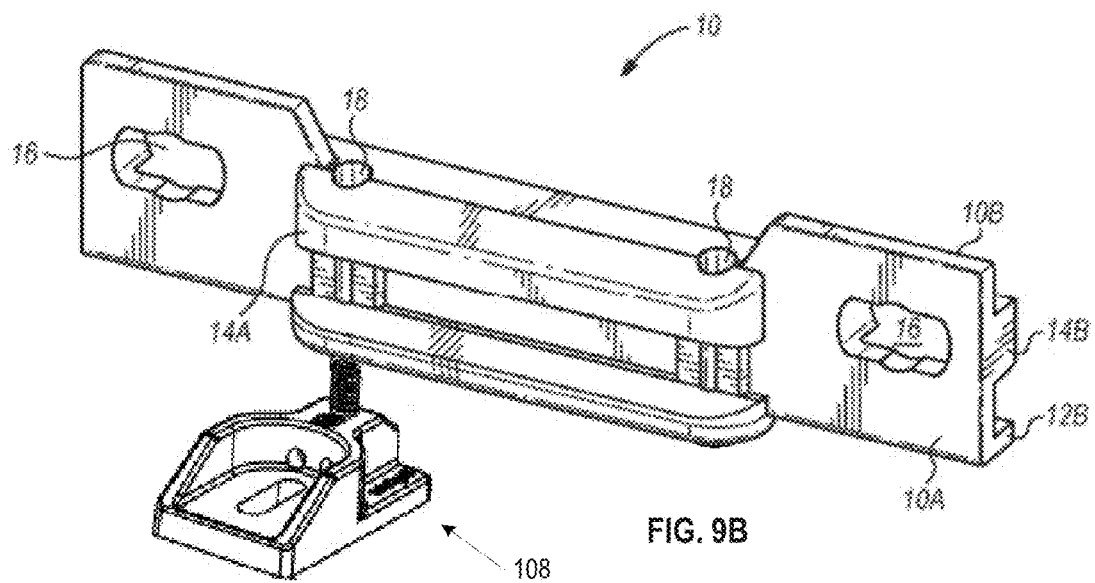
FIG. 9B is a perspective view of a photovoltaic module connector as shown in FIG. 1, coupled with a mounting foot, according to an alternative embodiment of the disclosure.

FIG. 9A is a perspective view of photovoltaic module connector 10 coupled with mounting foot 108, where mounting foot 108 is coupled with one of second pair of apertures 18 in connector 10. FIG. 9B is a perspective view of photovoltaic module connector 10 coupled with mounting foot 108, where mounting foot 108 is coupled with the other one of second pair of apertures 18 in connector 10 (as compared with FIG. 9B).

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A three-directional photovoltaic module connector comprising:
   an elongated member formed of a metal or alloy, having a primary axis along a length of the connector, a front vertical face, and a back vertical face, and having one or more cut-away sections filled in with a non-metal material;
   a serial connection portion-comprising:
   a front-upper ledge and a front-lower ledge, extending from the front vertical face substantially parallel to the primary axis, centered along the primary axis of the connector, forming a first channel therebetween configured to receive two photovoltaic modules; and
   a back-upper ledge and a back-lower ledge, extending from the back vertical lace substantially parallel to the primary axis, the back-lower ledge centered along the primary axis of the connector and the back-upper ledge extending along the entire length of the connector, forming a second channel therebetween configured to receive two photovoltaic modules;
   a parallel connection portion comprising a first pair of apertures, each aperture located near a distal end of the elongated member and passing through the front vertical face and the back vertical face of the elongated member and extending through a portion of the back-upper ledge; and
   a vertical connection portion comprising a second pair of apertures, orthogonal to the first pair of apertures, each aperture passing from a bottom of the elongated member to a top of the elongated member and extending through a portion of the elongated member between front-lower ledge and the back-lower ledge and through a portion between the front-upper ledge and the back-upper ledge.

2. The connector according to claim 1, wherein the front-lower ledge and the front-upper ledge both extend laterally an equal distance from the primary axis.

3. The connector according to claim 1, wherein the elongated member is substantially cast from a casting process.

4. The connector according to claim 3, wherein at least a portion of either the front-lower ledge or front-upper ledge is formed from an additive process after the casting process.

5. The connector according to claim 3, wherein at least a portion of either the back-lower ledge or back-upper ledge is formed from an additive process after the casting process.

6. The connector according to claim 1, wherein each of the first pair of apertures are adapted to receive a two-sided rotating photovoltaic module frame connector.

7. The connector according to claim 1, wherein the back-lower ledge and back-upper ledge have substantively flat surfaces configured to receive one or more photovoltaic modules in a primarily horizontal direction into the second channel.

8. The connector according to claim 1, wherein the front-lower ledge and the front-upper ledge have substantively tapered surfaces configured to receive one or more photovoltaic modules rotating or pivoting into the first channel.

9. The connector according to claim 1, wherein the photovoltaic module connector is formed through a casting process and the one or more cut-away sections are filled in via a subsequent additive process.

10. The connector according to claim 9, wherein the additive process comprises an overmolding process such that the cut-away sections are obscured and the connector has an overall appearance of having been extruded.

11. The connector according to claim 1, wherein the non-metal material is a rubber.

12. The connector according to claim 1, wherein the non-metal material is a plastic.

13. The connector according to claim 1, wherein the second pair of apertures are threaded apertures.

14. The connector according to claim 1, wherein the back-lower ledge and the back-upper ledge both extend laterally an equal distance from the primary axis.

* * * * *